United States Patent [19]
Todd

[11] Patent Number: 6,085,163
[45] Date of Patent: Jul. 4, 2000

[54] USING TIME-ALIGNED BLOCKS OF ENCODED AUDIO IN VIDEO/AUDIO APPLICATIONS TO FACILITATE AUDIO SWITCHING

[76] Inventor: Craig Campbell Todd, 100 Potrero Ave., San Francisco, Calif. 94103

[21] Appl. No.: 09/042,367

[22] Filed: Mar. 13, 1998

[51] Int. Cl.[7] .................................................. G10L 21/00
[52] U.S. Cl. ......................... 704/500; 704/501; 704/230; 704/503; 704/504
[58] Field of Search .................................. 704/500–504, 704/230; 370/529; 345/396, 397; 382/232, 240, 244, 248

[56] References Cited

U.S. PATENT DOCUMENTS

| | | | |
|---|---|---|---|
| 5,632,005 | 5/1997 | Davis et al. | 704/504 |
| 5,819,215 | 10/1998 | Dobson et al. | 704/230 |
| 5,832,445 | 11/1998 | Gao et al. | 704/501 |
| 5,845,243 | 12/1998 | Smart et al. | 704/230 |
| 5,860,060 | 1/1999 | Li et al. | 704/500 |
| 5,946,352 | 8/1999 | Rowlands et al. | 375/242 |

OTHER PUBLICATIONS

Brandenburg et al., ("ISO–MPEG–1 Audio: A generic Standard for coding of High Quality Digital Audio", 92nd Convention of the Audio Engineering Society, Vienna, Austria, Mar. 24–27, 1992, Revised Jul. 1994, pp. 780–792).
ISO/IEC 11172–3 (Jun. 1993, pp. 66–72).
MPEG: Historical Backgrounds (Jun. 1993, pp. 1–2).
Chiariglione ("The development of an Integrated Audiovisual Coding Standard:MPEG", proceedingd of the IEEE, vol. 2, Feb. 1995, pp. 151–157).
Proposed SMPTE Standard for Television—SMPTE 272M, SMPTE Journal, Apr. 1994, pp. 294–300.
Proposed SMPTE Standard for Television—SMPTE 299M, SMPTE Journal, Aug. 1996, pp. 516–523.
AES Recommended practice for digital audio engineering, AES3–1992 (ANSI S4.40–1992), J. Audio Eng. Soc., vol. 40, No. 3, Mar. 1992, pp. 147–165.
Fibush, D.K., "Integrated Digital Audio into the Serial Digital Video Signal," SMPTE Journal, Sep. 1994, pp. 574–579.
Proposed SMPTE Standard for Television—SMPTE 259M SMPTE Journal, Feb. 1993, pp. 174–179.
Report of the meeting of the SC–02–05 Working Group, J. Audio. Eng. Soc., vol. 43, No. 5, May 1995, p. 365.
AES Recommended practice for digital audio engineering, AES11–1997, J. Audio Eng. Soc., vol. 45, No. 4, Apr. 1997, pp. 260–269.

Primary Examiner—David R. Hudspeth
Assistant Examiner—Vijay B Chawan
Attorney, Agent, or Firm—Gallagher & Lathrop; David N. Lathrop

[57] ABSTRACT

An audio signal processor forms gaps or guard bands in sequences of blocks conveying encoded audio information and time aligns the guard bands with video information. The guard bands are formed to allow for variations in processing or circuit delays so that the routing or switching of different streams of video information with embedded audio information does not result in a loss of any encoded audio blocks.

22 Claims, 6 Drawing Sheets

USING TIME-ALIGNED BLOCKS OF ENCODED AUDIO IN VIDEO/AUDIO APPLICATIONS TO FACILITATE AUDIO SWITCHING

TECHNICAL FIELD

The present invention relates generally to audio signal processing in video/audio applications. More particularly, the present invention relates to block-coding methods for encoding and decoding sequences of blocks of audio information separated by gaps or guard bands so that normal variations in signal processing delays will not disrupt the alignment of video and audio information.

BACKGROUND ART

Several international standards have been developed which define various aspects of embedding digital audio information into frames of video information. For example, standard SMPTE 259M published by the Society of Motion Picture and Television Engineers (SMPTE) defines a Serial Digital Interface (SDI) in which up to four channels of digital audio information may be embedded into component and composite serial digital video signals. Standard SMPTE 272M provides a full definition of how digital audio information is to be embedded in ancillary data spaces within frames of the video information.

The serial transmission of digital audio information itself is the subject of various international standards. For example, standard AES3 (ANSI S4.40) published by the Audio Engineering Society (AES), defines serial transmission of two-channel digital audio represented in a linear pulse code modulation (PCM) form. According to this standard, PCM samples for two channels are interleaved and conveyed in pairs.

A common activity in nearly all recording and broadcasting applications is editing or cutting embedded video/audio information streams and splicing the cut information streams to form a new single stream. Similar activities generate an information stream by merging multiple information streams or by switching between multiple streams. The video information is normally the primary synchronizing reference so that an edit or cut point is normally aligned with a video frame.

Standards such as AES11 define recommended practices for synchronizing digital audio equipment in studio operations. AES11 is directed toward controlling timing uncertainties caused by jitter or processing delays and provides for aligning video frame information with the two-sample frames of AES3 digital audio information streams. Equipment and methods that adhere to this standard can ensure that synchronized signals have the same number of frames over a given period of time and contain samples that have a common timing. Unfortunately, no standards or practices currently exist which define an alignment between video information and larger intervals of audio information. As a result, equipment from different manufacturers and even from the same manufacturer have variations in timing and in processing delays that introduce a significant amount of uncertainty in the relative alignment of audio and video information.

This uncertainty in alignment is of little consequence in applications that use linear representations of audio information such as that defined in the AES3 standard. Because edit points are constrained to occur between the two-sample frames of audio information, any uncertainty in video/audio alignment will not result in the loss of audio information. It will only affect the relative timing of sound and picture as presented to a person, which is unlikely to be discernable.

There is, however, a growing number of applications that use bit-rate-reduction encoding techniques to embed greater numbers of audio channels into a video/audio data stream. These encoding techniques are often applied to sample blocks of 128 or more audio samples to generate blocks of encoded information. These sample blocks typically represent audio information that spans an interval of 3 to 12 ms. Each block of encoded information generated by these encoding processes represents the smallest unit of information from which a reasonably accurate replica of a segment of the original audio information can be recovered. Split-band coding techniques reduce bit rates by applying psychoacoustic-based coding to frequency-subband representations of an audio signal. The frequency-subband representations may be generated by application of a plurality of bandpass filters or one or more transforms. For ease of discussion, these split-band coding techniques are described here in terms of applying a filterbank to generate subband signals.

The uncertainty in alignment mentioned above is significant in these block-coding applications because an edit point falling within the boundaries of an encoded block will result in part of that block being cut from the remaining signal. The partial loss of an encoded block will be manifested by a loss in the recovered signal for a duration typically of 3 ms or more. It is likely that such a loss would be discernable to the human auditory system.

This problem may be avoided by using a post-processing process in which a PCM representation of the original audio signals is recovered by applying a decoding process to the encoded audio, editing the recovered PCM representation as required, and generating a new encoded representation by applying an encoding processed to the edited PCM audio information. This solution is unattractive because of the additional costs and degradation in audio quality resulting from the decoding/re-encoding processes. In addition, for reasons that will be better understood after reading the discussion set forth below, post-processing is unattractive because the decoding/re-encoding processes introduce additional delays in the audio information stream.

DISCLOSURE OF INVENTION

It is an object of the present invention to provide for the processing of embedded video/audio information streams that permits activities like editing and switching while avoiding the aforementioned problems.

According to the teachings of one aspect of present invention, a method receives an input audio signal conveying audio information, receives a reference signal conveying a video frame reference for each video frame of a sequence of video frames, generates blocks of encoded information that represent the audio information in a bit-rate reduced form by applying a block-encoding process to the input audio signal, and assembles blocks of encoded information into an output signal comprising a plurality of sequences of blocks of encoded information such that a beginning block in a respective sequence is separated from an ending block in a preceding sequence by a gap that is time aligned with a respective video frame reference.

According to the teachings of another aspect of the present invention, a method receives a reference signal conveying a video frame reference for each video frame of a sequence of video frames, receives an input signal and generates in response thereto a plurality of sequences of blocks of encoded information, wherein a beginning block in a respective sequence of blocks is separated from an ending block in a preceding sequence of blocks by a gap that is time aligned with a respective video frame reference, and generates audio information that represents the encoded information in a decoded form by applying a block-decoding process to the blocks of encoded information, wherein a respective segment of the audio information is generated from the respective sequence of blocks of encoded information and the respective segment of audio information is time-aligned with a video frame reference subsequent to the respective video frame reference.

The various features of the present invention and its preferred embodiments may be better understood by referring to the following discussion and the accompanying drawings in which like reference numerals refer to like elements in the several figures. The contents of the following discussion and the drawings are set forth as examples only and should not be understood to represent limitations upon the scope of the present invention.

MODES FOR CARRYING OUT THE INVENTION

Overview of a System

Figure 1:
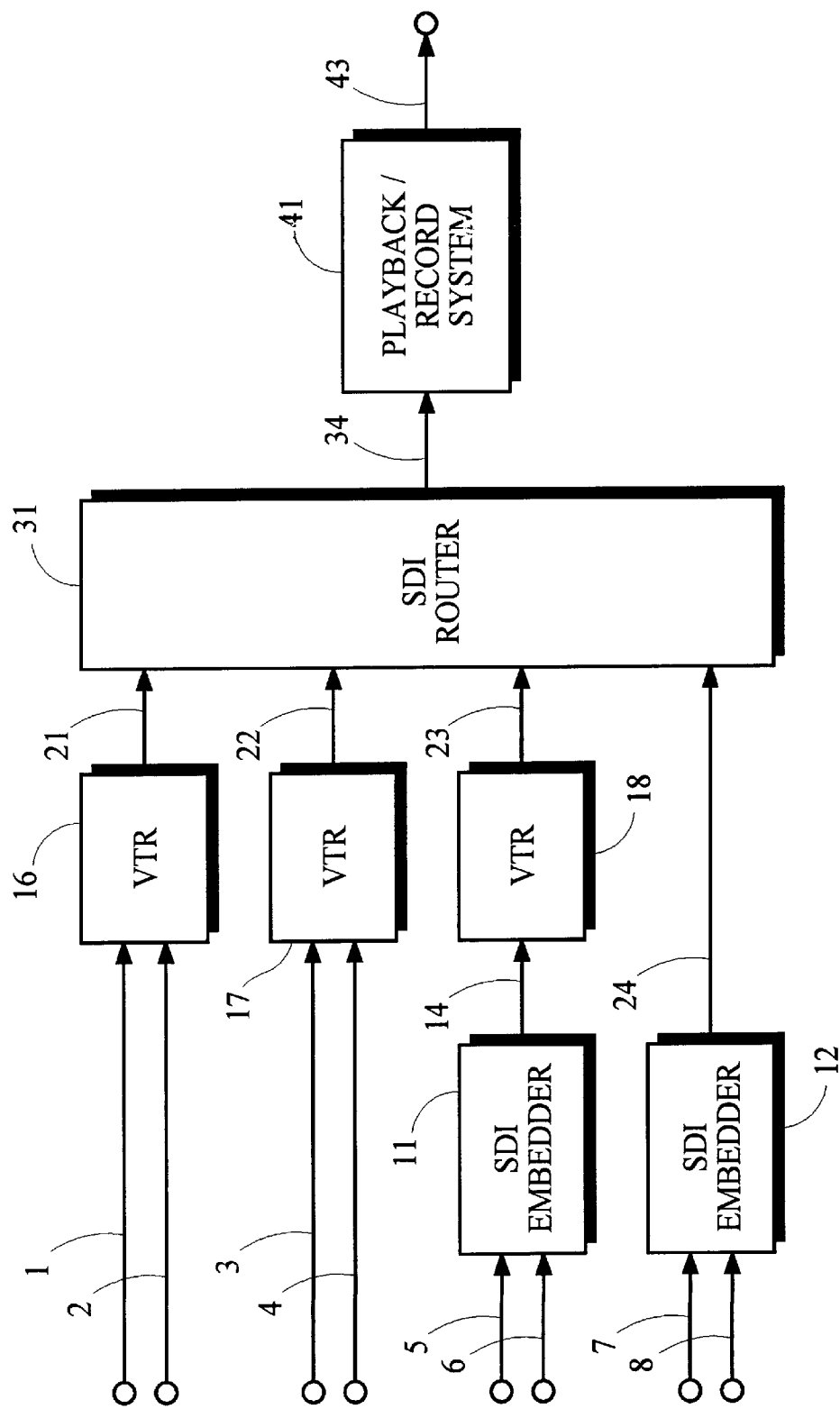
FIG. 1 is a functional block diagram of one embodiment of a system for recording and for routing multiple video/audio data streams.

FIG. 1 illustrates one embodiment of a system for recording and for routing multiple video/audio data streams and represents one example of a system that can advantageously employ aspects of the present invention. For the sake of clarity, this figure as well as all other figures do not illustrate signal paths for carrying master clock signals used to synchronize the equipment. It is assumed in this discussion that signals such as those generated along paths 21, 22, 23 and 24 conform to standards SMPTE 259M and SMPTE 272M; however, no particular standard or signal format is essential to practice the present invention. For example, in an alternative embodiment of the system, separate signals each conveying respective video information and audio information are generated along paths 21 through 24 and router 31 includes circuitry for separately routing video and audio information. In such an embodiment, an SDI disembedder is interposed between SDI embedder 12 and router 31. This alternative embodiment is mentioned here to show that no particular signal format is essential to practice the present invention.

Video tape recorder (VTR) 16 receives video information from path 1 and audio information from path 2 and records this video/audio information on tape. Subsequently, VTR 16 reads the video/audio information recorded on tape and generates along path 21 a playback signal conveying the video information with embedded audio information. In a similar manner, VTR 17 records video and audio information received from paths 3 and 4, respectively, and subsequently generates along path 22 a playback signal conveying the video information with embedded audio information.

VTR 16, VTR 17 and VTR 18 include circuitry such as a Serial Digital Interface (SDI) embedder for embedding audio information into the video information during playback.

SDI embedder 11 receives video and audio information from paths 5 and 6, respectively, and generates along path 14 a signal conveying digital video information with embedded digital audio information. VTR 18, which includes circuitry such as a SDI disembedder, extracts audio information from the video/audio data signal and records the separated video and audio information on tape. Subsequently, VTR 18 recovers the video and the audio information from tape and uses circuitry such as an SDI embedder to generate along path 23 a playback signal conveying the video and embedded audio information. If a digital data recorder is substituted for VTR 18, however, neither embedder nor disembedder circuitry is required in the recorder because the video/audio data stream itself can be recorded and played back.

SDI embedder 12 receives video and audio information from paths 7 and 8, respectively, and generates along path 24 a signal conveying digital video information with embedded digital audio information.

SDI router 31 receives video/audio signals from paths 21, 22, 23 and 24 and selectively routes or switches these signals along path 34 to playback/record device 41. The number of signals received by SDI router 31 is not significant. Playback/record device 41 represents an arbitrary device that uses the signal passed along path 34. For example, it can be a recording device such as VTR or a playback device such as a television set. Furthermore, playback/record 41 may be located remotely with respect to SDI embedder 31, in which case path 34 represents a communication or broadcast channel.

Shifts in Video/Audio Alignment

Circuit delays in VTR 16, 17, 18 and in SDI embedder 11 and 12 may alter the relative alignment of video information and audio information. As a result, the alignment of video/audio information in playback signal 21, for example, may be shifted with respect to the alignment between video information and audio information as received paths 1 and 2, respectively. The amount of the change in alignment varies among equipment from different manufacturers, can vary among different pieces of equipment from the same manufacturer, and can even vary within a given piece of equipment as a function of the initialization state of buffers, for example.

Figure 2A:
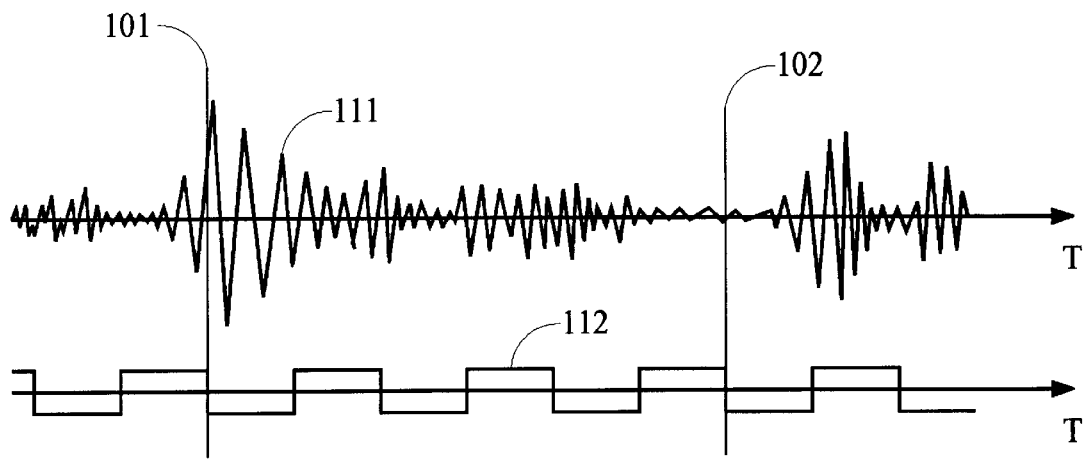
FIGS. 2A through 2C are graphical representations of hypothetical audio signals having various alignments with video frame references.

Referring to FIG. 2A, signal 111 represents audio information having a particular alignment with video frame references 101 and 102. Each of these video frame references indicates a particular reference point in a respective video frame. A common reference point for NTSC video information, for example, coincides with the video information for line 10 in each frame. A common reference point for PAL video information coincides with line 1 in each frame. No particular alignment is critical to the practice of the present invention.

Figure 2B:
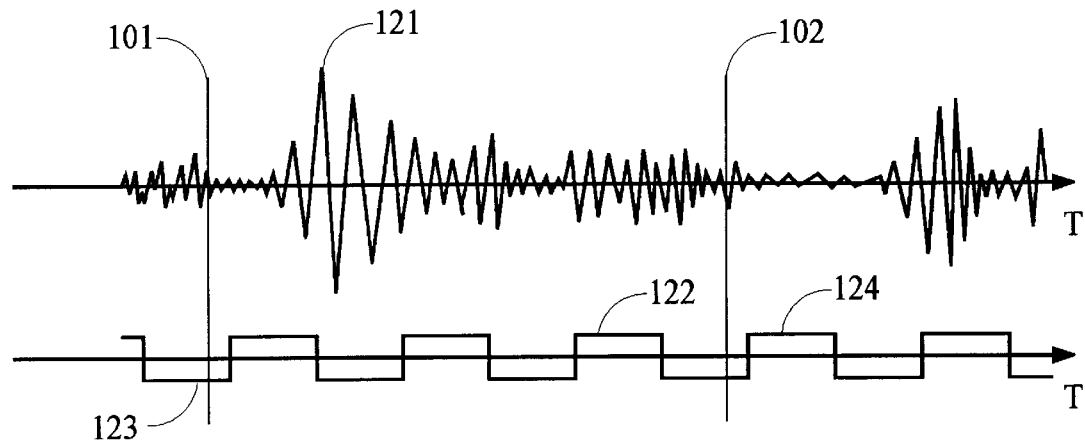
Figure 2C:
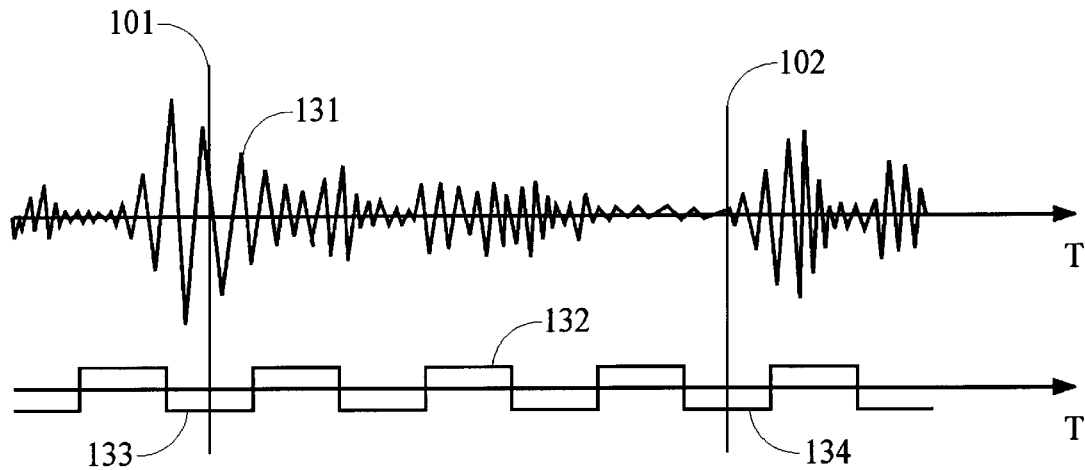

In FIG. 2B, signal 121 represents the same audio information as that conveyed by signal 111 but is delayed with respect to signal 111. As a result, the alignment between signal 121 and the video frame references is shifted with respect to the alignment for signal 111. In FIG. 2C, signal 131 represents the same audio information as that conveyed by signal 111 but is advanced with respect to signal 111; hence, the alignment between signal 131 and the video frame references is shifted in a manner opposite to the shift in alignment of signal 121.

Referring to FIG. 1, suppose the audio information and alignment represented in FIG. 2A is conveyed by paths 112, 3/4, 5/6 and 7/8. Different shifts in alignment such as those illustrated in FIGS. 2A through 2C will likely exist in the signals generated along paths 21 through 24. Suppose further that the alignments illustrated in FIGS. 2A through 2C exist in the signals generated along paths 21 through 23, respectively. When SDI router 31 switches between signals received from these three paths, a small discontinuity will occur in the audio information embedded in the signal passed along path 34. If the audio information is represented in a linear form such as PCM, this discontinuity probably cannot be perceived by a human listener because the discontinuity is only for a few samples. It would be especially difficult to discern a discontinuity between two signals having different audio content.

Effects of Encoding

As explained above, however, there is a growing interest to embed greater numbers of audio channels into a video/audio data stream. When the capacity of the information in these greater number of audio channels exceeds the capacity of the space available for audio information, some form of bandwidth or bit-rate compression is employed. One example of such compression is audio coding based on psychoacoustic principles.

These encoding techniques are often applied to blocks of audio samples to generate blocks of encoded information. These sample blocks typically represent audio information that spans an interval of 3 to 12 ms. Each block of encoded information generated by these encoding processes represents the smallest unit of information from which a reasonably accurate replica of a segment of the original audio information can be recovered.

A sequence of encoded information blocks 112 is represented as a train of pulses in FIG. 2A. The information conveyed by these blocks is an encoded representation of the audio information in signal 111. The shape and size of the pulses is not significant. The pulse train is intended only to suggest a sequence of blocks that convey encoded information corresponding to blocks of audio samples that may abut one another or, preferably, overlap one another. In the example shown in FIG. 2A, the audio information spanning the interval between adjacent video frame references is represented by six blocks of encoded information. Various considerations for improving the quality of audio coding in video/audio applications is disclosed in copending U.S. patent application Ser. No. 08/953,106, which is incorporated herein by reference in its entirety.

When block encoding techniques are used in the system of FIG. 1, the signals that SDI router 31 receives from paths 21 through 24 contain audio information encoded in blocks. As discussed above, varying shifts in alignment may occur between the encoded information blocks and the video frame references. This is illustrated by the different alignments between video frame reference 101, for example, and blocks 112, 122 and 132 shown in FIGS. 2A, 2B and 2C, respectively. Suppose, as discussed above, that the alignments illustrated in FIGS. 2A through 2C exist in the signals generated along paths 21 through 23, respectively. When SDI router 31 switches at video frame reference 101 from the signal received via path 22, illustrated in FIG. 2B, to the signal received via path 23, illustrated in FIG. 2C, a significant amount of audio information at the switch point cannot be recovered from the signal routed along path 23. The audio information conveyed in block 123 prior to the switch point cannot be recovered because, on the one hand, the entire block is needed to recover the audio information but, on the other hand, the portion of that block after the switch point is missing. Similarly, the audio information conveyed in block 133 after the switch point cannot be recovered because the portion of block 133 prior to the switch point is missing.

This problem is not unique to the type of system illustrated in FIG. 1. For example, the problem also occurs with tape edits or audio dubbing for a single VTR.

As will be explained more fully below, the present invention overcomes this problem by forming guard bands or gaps in the encoded audio stream so that considerable variation in video/audio alignment can be tolerated without loss of audio information.

Encoding Signal Processor

Figure 3:
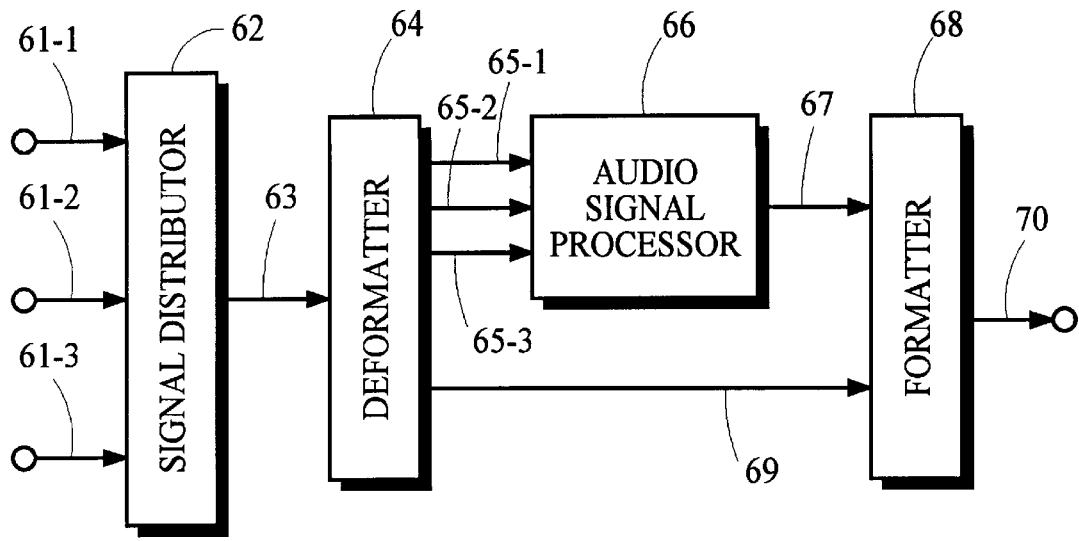
FIG. 3 is a functional block diagram of one embodiment of a device for processing video signals with embedded audio information.

FIG. 3 illustrates a video/audio signal processor that can be incorporated in a variety of ways into a system such as that illustrated in FIG. 1. In the embodiment shown, a plurality of signals conveying video information with embedded audio information are received from input signal paths 61-1, 61-2 and 61-3. Three input signal paths are shown in the figure; however, embodiments of the present invention may have signal paths for essentially any number of input signals. Signal distributor 62 represents a wide range of signal distribution processes including switching, merging, editing, splicing and storage/retrieval. For simplicity, the illustration and discussion herein assume signal distributor 62 receives a plurality of video/audio signals and processes and/or distributes those signals in some manner to generate along path 63 a single signal conveying video information with embedded audio information. Deformatter 64 receives the video/audio information from path 63, extracts the embedded audio information and passes it along path 65. The video information may be passed along path 69. Audio signal processor 66 receives audio information from path 65 and applies a block-encoding process to the audio information to generate along path 67 blocks of encoded information. Formatter 68 receives the blocks of encoded information from path 67 and generates along path 70 an output signal comprising a plurality of sequences of blocks of encoded information with gaps or guard bands between a beginning block in one sequence and an ending block in a preceding sequence. Using a reference signal such as a master clock signal, the gap or guard band is time aligned with the video information.

As mentioned above, the figures do not illustrate signal paths for carrying master clock signals used to synchronize the equipment. In a preferred embodiment, audio signal processor 66 forms audio sample blocks that are aligned with the master clock signal. This alignment is illustrated in FIG. 2A where boundaries between adjacent sample blocks coincide with video frame references 101 and 102; however, other alignments may be used.

Figure 5A:
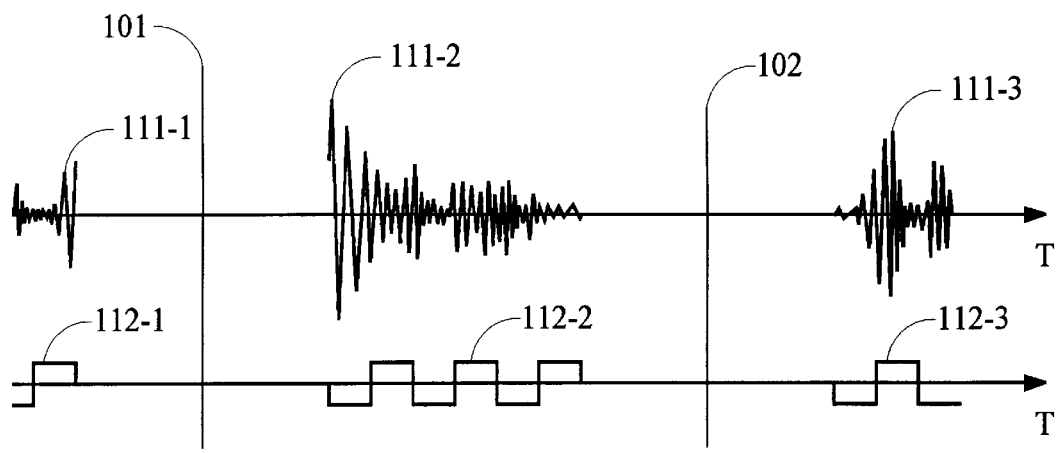
FIGS. 5A through 5C are graphical representations of hypothetical audio signals processed according to the present invention and having various alignments with video frame references.

Referring to FIG. 5A, sequence of blocks 112-2 conveys encoded information representing signal segment 111-2, which is a hypothetical time-compressed representation of the portion of signal 111 between video frame references 101 and 102. Similarly, sequence of blocks 112-1 conveys encoded information representing signal segment 111-1 and sequence of blocks 112-3 conveys encoded information representing signal segment 111-3. Audio signal processor 66 and formatter 68 generate sequences of blocks conveying an encoded representation of the audio information in which, for example, a guard band or gap has been formed between the ending block in sequence 112-1 and the beginning block in sequence 112-2.

Figure 5B:
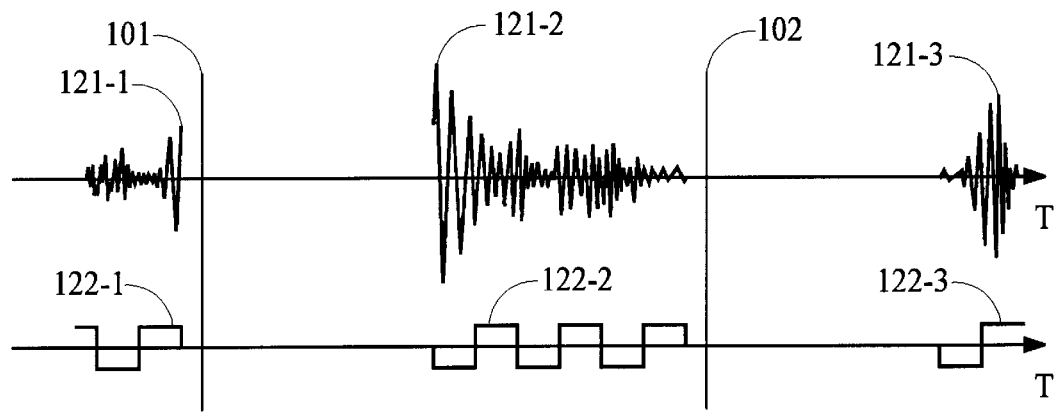
Figure 5C:
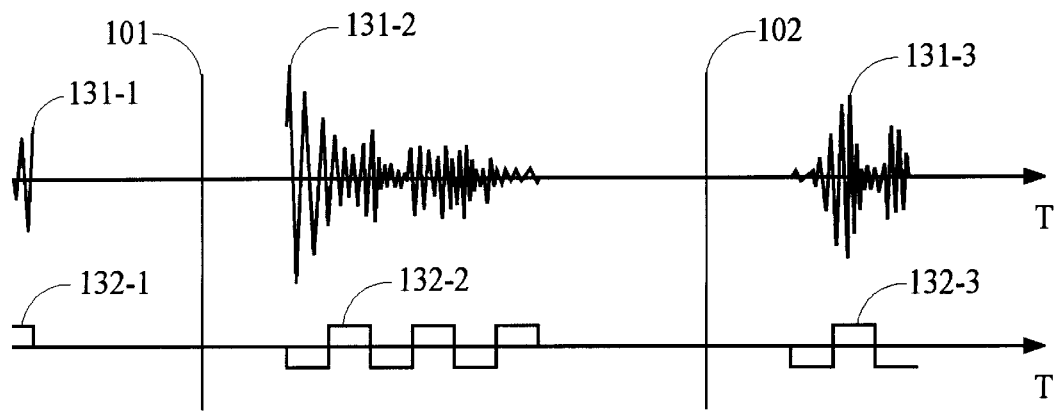

The shifts in alignment illustrated in FIGS. 2A through 2C are also illustrated in FIGS. 5A through 5C. In these figures, encoded information in sequences 122-1, 122-2, 122-3, 132-1, 132-2 and 132-3 convey encoded information representing signal segments 121-1, 121-2, 121-3, 131-1, 131-2 and 131-3, respectively. As may be seen from FIGS. 5B and 5C, no loss in audio information occurs as a result of shifts in alignment because potential switch points at video frame references 101 and 102 occur within a guard band.

The signal processor illustrated in FIG. 3 can be incorporated into an SDI router, for example, to process video signals containing embedded AES3 or PCM audio information. An embodiment omitting signal distributor 62 can be incorporated into a VTR or SDI embedder. Another embodiment that also omits deformatter 64 can be incorporated into a VTR or into the input circuits of an SDI embedder.

Figure 4:
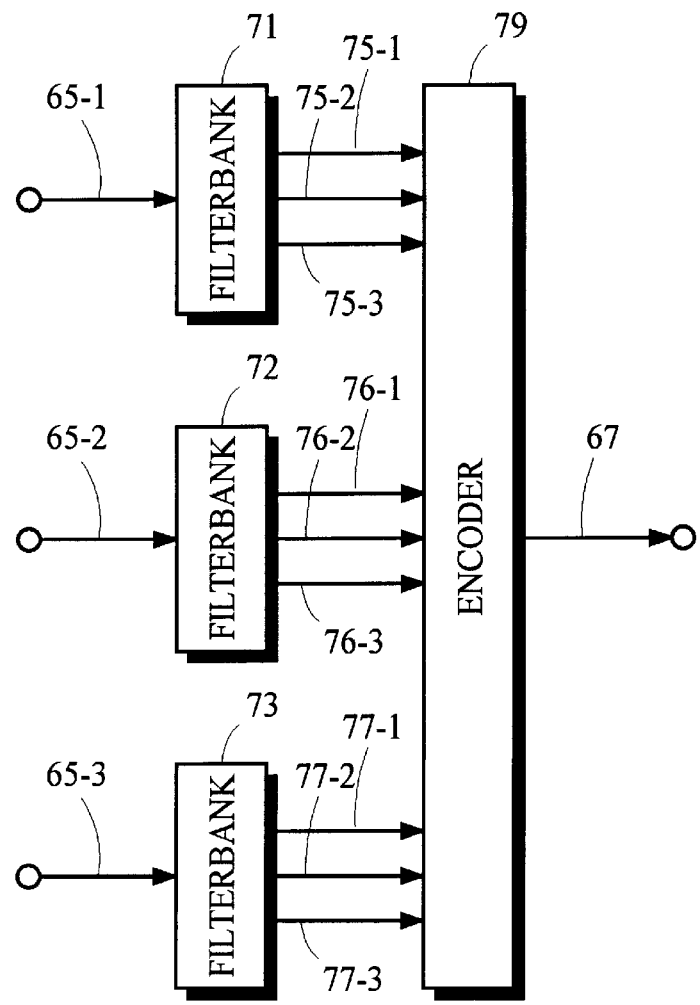
FIG. 4 is a functional block diagram of one embodiment of an encoding audio signal processor according to various aspects of the present invention.

FIG. 4 illustrates one embodiment of an encoding audio signal processor that is suitable for incorporation into the embodiment illustrated in FIG. 3 and also has separate utility as will be explained below. According to this embodiment, audio signal processor 66 comprises a plurality of filterbanks 71, 72 and 73. Filterbank 71 generates a plurality of frequency subband signals along paths 75-1 through 75-3 in response to the signal received from path 65-1. Filterbank 72 generates a plurality of frequency subband signals along paths 76-1 through 76-3 in response to the signal received from path 65-2. Filterbank 73 generates a plurality of frequency subband signals along paths 77-1 through 77-3 in response to the signal received from path 65-3. Filterbanks 71, 72 and 73 may be implemented in a number of ways including a bank of bandpass filters, a cascading set of bandsplitting filters, and one or more time-domain-to-frequency-domain transforms. Only three filterbanks are shown and only three subband signals are shown for each filterbank, however, an embodiment may include many more filterbanks that each generate twenty-four or more subband signals, each representing frequency subbands having bandwidths commensurate with or less than the critical bandwidths of the human auditory system. Encoder 79 applies a block encoding process to the subband signals and generate along path 67 a sequence of blocks representing in an encoded form the audio information received via paths 65-1, 65-2 and 65-3.

Split-band coding is not essential to practice the present invention. Other forms of coding such as block-companded PCM or delta-modulation may be used.

In one practical embodiment, an encoding audio signal processor receives eight channels of audio information in linear PCM form or, alternatively, four AES3 data streams, and uses eight filterbanks and an encoder that applies a block encoding process to generate blocks of encoded information with guard bands that can be conveyed in a space or bandwidth no larger than that required to convey two channels of audio information in linear PCM form or, alternatively, one AES3 data stream.

Decoding Signal Processor

Figure 6:
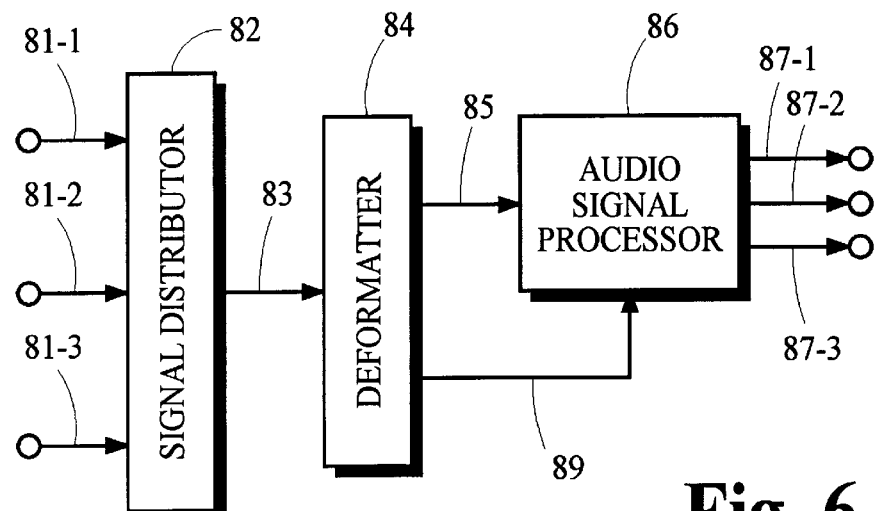
FIG. 6 is a functional block diagram of one embodiment of a device for processing video signals with embedded audio information.

FIG. 6 illustrates a video/audio signal processor that can be incorporated in a variety of ways into a system such as that illustrated in FIG. 1. In the embodiment shown, a plurality of signals conveying video information with embedded encoded audio information are received from input signal paths 81-1, 81-2 and 81-3. Three input signal paths are shown in the figure; however, embodiments of the present invention may have signal paths for essentially any number of input signals. Signal distributor 82 represents a wide range of signal distribution processes including switching, merging, editing, splicing and storage/retrieval. For simplicity, the illustration and discussion herein assume signal distributor 82 receives a plurality of video/audio signals and processes and/or distributes those signals in some manner to generate along path 83 a signal conveying video information with embedded encoded audio information arranged in a plurality of sequences with gaps or guard bands between sequences that are aligned with the video information. Deformatter 84 receives the video/audio information from path 83, extracts the embedded sequences of blocks conveying encoded audio information and passes the extracted sequences along path 85. The video information may be passed along path 89. Audio signal processor 86 receives sequences of blocks of encoded audio information from path 85 and applies a block-decoding process to the blocks in each sequence of blocks of encoded audio information to generate along path 87 a respective segment of decoded audio information. Each respective segment is time aligned with the video information according to a reference signal such as a master clock signal or a reference signal extracted or derived from the video/audio signal received from path 83.

Figure 8A:
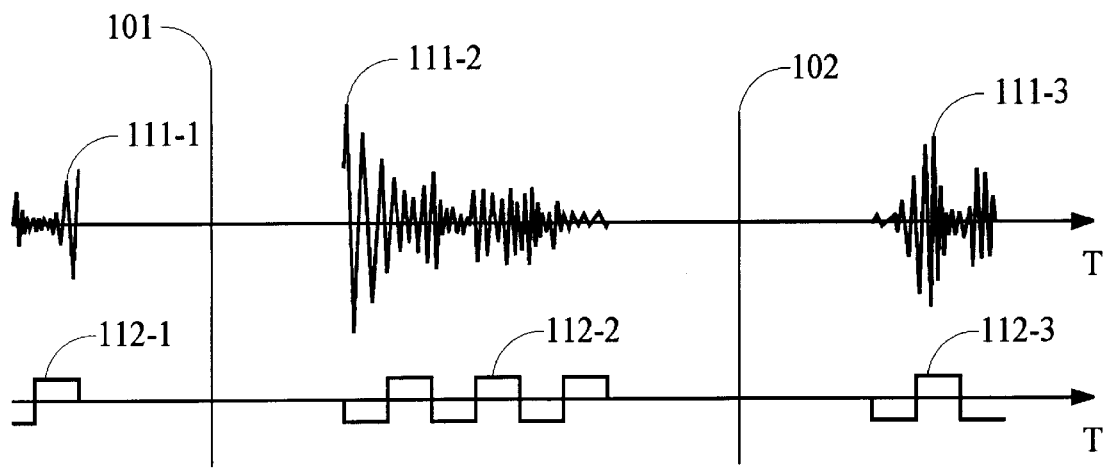
FIGS. 8A and 8B are graphical representations of hypothetical audio signals encoded and decoded according to various aspects of the present invention.
Figure 8B:
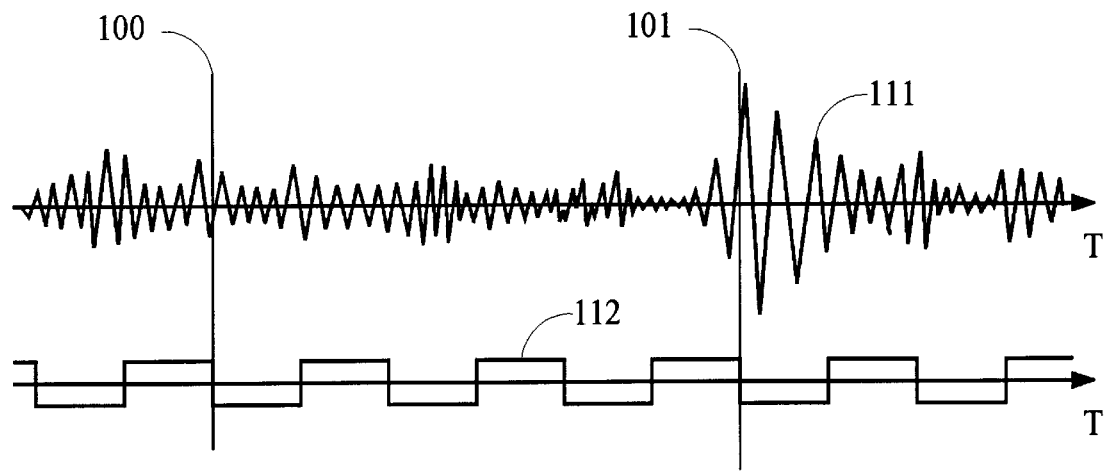

FIG. 8A reproduces the content of FIG. 5A in which sequence of blocks 112-2 conveys encoded information representing signal segment 111-2, which is a hypothetical time-compressed representation of the portion of signal 111 between video frame references 101 and 102. Audio signal processor 86 applies a block-decoding process to block sequence 112-2, for example, to generate signal segment 111-2; however, as shown in FIG. 8B, the portion of signal 11 corresponding to signal segment 111-2 is generated so that it is aligned with video frame reference 101. This alignment may be accomplished by delaying both the video reference and the decoded audio information by appropriate amounts. In the example shown, the video references in FIG. 8B as compared to the video references in FIG. 8A are delayed by an interval exactly equal to the duration of one video frame. No particular delay interval is critical to the practice of the present invention; however, in preferred embodiments, the video references are delayed by an integer number of frames, typically one frame, so that synchronization with a master clock may be preserved.

The signal processor embodiment illustrated in FIG. 6 can be incorporated into an SDI router, for example, to process video signals containing embedded encoded audio information. An embodiment omitting signal distributor 82, which can receive and decode embedded encoded audio information, can be incorporated into a variety of equipment including VTRs, SDI disembedders, and playback/record device 41.

Figure 7:
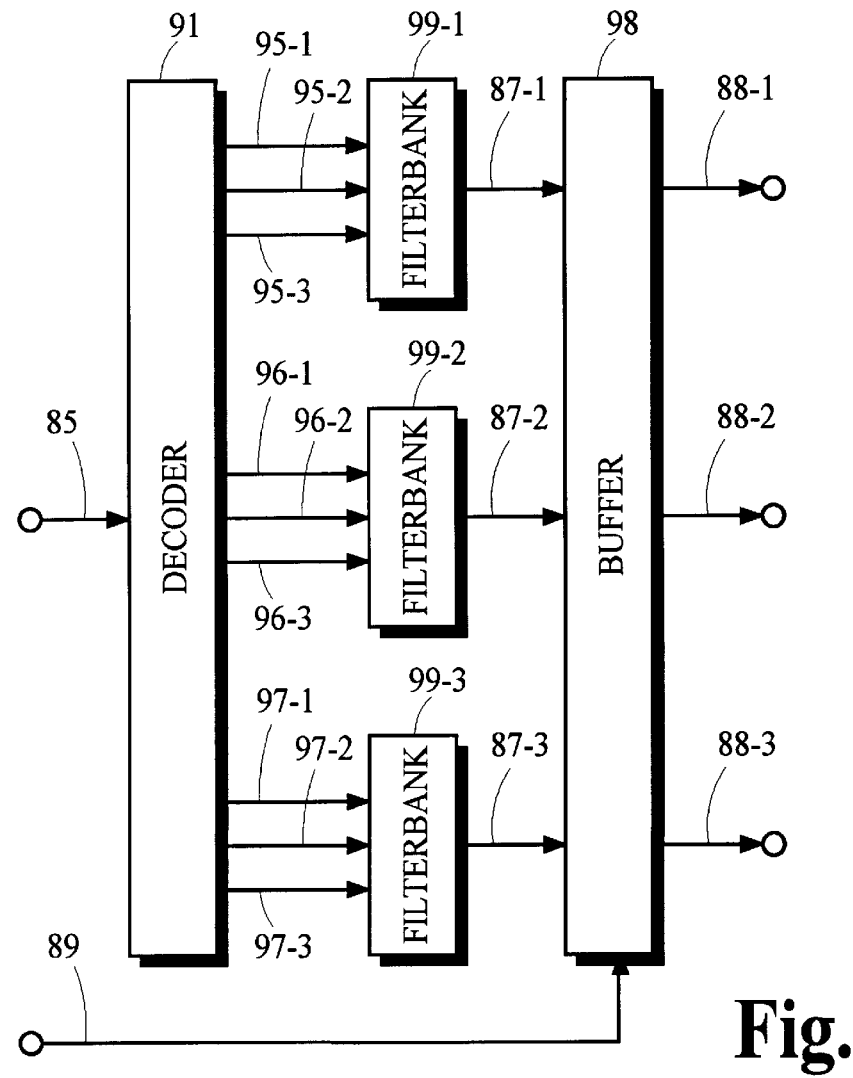
FIGS. 7 is a functional block diagram of one embodiment of a decoding audio signal processor according to various aspects of the present invention.

One embodiment of decoding audio signal processor 86 is shown in FIG. 7. In the embodiment shown, decoder 91 receives sequences of blocks of encoded information from path 85 and recovers frequency subband signals for a plurality of channels. Subband signals for a first channel are passed along paths 95-1, 95-2 and 95-3, subband signals for a second channel are passed along paths 96-1, 96-2 and 96-3, and subband signals for a third channel are passed along paths 97-1, 97-2 and 97-3. Only three channels, each with three subband signals, are shown; however, as explained above, an embodiment may include a greater or lesser number of channels, and these channels may be represented by a considerably greater number of subband signals. In response to subband signals received from paths 95-1, 95-2 and 95-3, filterbank 99-1 generates audio information for the first channel along path 87-1. In response to subband signals received from paths 96-1, 96-2 and 96-3, filterbank 99-2 generates audio information for the second channel along path 87-2. In response to subband signals received from paths 97-1, 97-2 and 97-3, filterbank 99-3 generates audio information for the first channel along path 87-3. A video-frame reference signal received from path 89 is used to align the audio information generated by filterbanks 99-1, 99-2 and 99-3.

Overlapping Blocks and Window Functions

The train of pulses used in the figures to represent blocks of information suggest that adjacent blocks abut but do not overlap one another. Although no particular arrangement of blocks is critical to the practice of the present invention, preferred embodiments process blocks that overlap one another. Generally, overlapped blocks of audio information are weighted or modulated by a window function so that the sum of overlapped samples in adjacent blocks is substantially equal to a constant.

Figure 9:
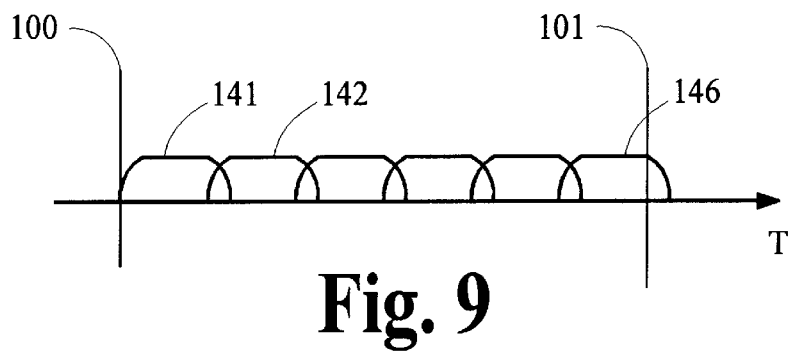
FIG. 9 is a graphical schematic representation of overlapping audio information blocks weighted by window functions.

FIG. 9 illustrates a sequence of blocks. Beginning block 141 in the sequence overlaps adjacent block 142. All blocks in the sequence are represented by an envelope that has the shape of a window function used to weight corresponding audio information in the time domain. Ending block 146 in the sequence overlaps the preceding block and a subsequent block not shown in the figure. The amount of overlap and the choice of window function can have significant effects on coding performance but no particular window function or amount of overlap is critical to the present invention. In preferred embodiments, the amount of overlap is equal to one-half the block length and the window function is derived from the Kaiser-Bessel function.

As explained above, audio signal processor 86 generates audio information that is aligned with video frame references. In embodiments that generate sequences of blocks of audio information, the alignment may be such that a video frame reference is coincident with essentially any point in any block of the sequence. In the example shown in FIG. 9, the start of beginning block 141 is coincident with video frame reference 100.

In some applications, the exact point of coincidence may vary from video frame to video frame. For example, in applications that combine digital audio information with NTSC video information, successive video frames may have varying numbers of audio samples because the audio sampling rate is not an integer multiple of the video frame rate.

Various considerations for block length, window function, and video/audio alignment are discussed in U.S. patent application Ser. No. 08/953,106, referred to above.

What is claimed is:

1. A method for processing audio information comprising:

receiving an input audio signal conveying said audio information, receiving a reference signal conveying a video frame reference for each video frame of a sequence of video frames, generating blocks of encoded information that represent said audio information in a bit-rate reduced form by applying a block-encoding process to said input audio signal, and assembling blocks of encoded information into an output signal comprising a plurality of sequences of blocks of encoded information such that a beginning block in a respective sequence is separated from an ending block in a preceding sequence by a gap that is time aligned with a respective video frame reference.

2. A method according to claim 1 wherein said block-encoding process encodes said audio information into a form that contains less redundancy and/or less perceptual irrelevance.

3. A method according to claim 2 wherein said block-encoding process comprises:

applying a bank of bandpass filters to said input audio signal to generate a plurality of frequency subband representations of said input audio signal, and generating said blocks of encoded information by adaptively allocating bits to said frequency subband representations according to psychoacoustic principles.

4. A method according to claim 1 or 3 wherein each of said video frames has a duration equal to a frame interval and the duration of said gaps is within a range from about one percent of said frame interval to about twenty percent of said frame interval.

5. A method according to claim 2 wherein said block-encoding process comprises:

applying one or more transforms to said input audio signal to generate a plurality of frequency subband representations of said input audio signal, and generating said blocks of encoded information by adaptively allocating bits to said frequency subband representations according to psychoacoustic principles.

6. A method according to claim 1 wherein said video frames comprise video information arranged in a plurality of video lines and each of said gaps has a duration greater than that of three video lines.

7. A method for processing encoded audio information comprising:

receiving a reference signal conveying a video frame reference for each video frame of a sequence of video frames, receiving an input signal and generating in response thereto a plurality of sequences of blocks of encoded information, wherein a beginning block in a respective sequence of blocks is separated from an ending block in a preceding sequence of blocks by a gap that is time aligned with a respective video frame reference, and generating audio information that represents said encoded information in a decoded form by applying a block-decoding process to said blocks of encoded information, wherein a respective segment of said audio information is generated from said respective sequence of blocks of encoded information and said respective segment of audio information is time-aligned with a video frame reference subsequent to said respective video frame reference.

8. A method according to claim 7 wherein said block-decoding process comprises:

generating a plurality of frequency subband representations of an audio information by adaptively allocating bits to said blocks of encoded information according to psychoacoustic principles, and applying a bank of synthesis filters to said frequency subband representations to synthesize said audio information.

9. A method according to claim 7 or 8 wherein each of said video frames has a duration equal to a frame interval and the duration of said gaps is within a range from about one percent of said frame interval to about twenty percent of said frame interval.

10. A method according to claim 7 wherein said video frames comprise video information arranged in a plurality of video lines and each of said gaps has a duration greater than that of three video lines.

11. A method according to claim 6 wherein said block-decoding process comprises:

generating a plurality of frequency subband representations of an audio information by adaptively allocating bits to said blocks of encoded information according to psychoacoustic principles, and applying one or more inverse transforms to said frequency subband representations to synthesize said audio information.

12. An apparatus for processing audio information comprising:

means for receiving an input audio signal conveying said audio information, means for receiving a reference signal conveying a video frame reference for each video frame of a sequence of video frames, means for generating blocks of encoded information that represent said audio information in a bit-rate reduced form by applying a block-encoding process to said input audio signal, and means for assembling blocks of encoded information into an output signal comprising a plurality of sequences of blocks of encoded information such that a beginning block in a respective sequence is separated from an ending block in a preceding sequence by a gap that is time aligned with a respective video frame reference.

13. An apparatus according to claim 12 wherein said block-encoding process encodes said audio information into a form that contains less redundancy and/or less perceptual irrelevance.

14. An apparatus according to claim 13 wherein said block-encoding process comprises:

means for applying a bank of bandpass filters to said input audio signal to generate a plurality of frequency subband representations of said input audio signal, and means for generating said blocks of encoded information by adaptively allocating bits to said frequency subband representations according to psychoacoustic principles.

15. An apparatus according to claim 12 or 14 wherein each of said video frames has a duration equal to a frame interval and the duration of said gaps is within a range from about one percent of said frame interval to about twenty percent of said frame interval.

16. An apparatus according to claim 11 wherein said block-encoding process comprises:

means for applying one or more transforms to said input audio signal to generate a plurality of frequency subband representations of said input audio signal, and means for generating said blocks of encoded information by adaptively allocating bits to said frequency subband representations according to psychoacoustic principles.

17. An apparatus according to claim 12 wherein said video frames comprise video information arranged in a plurality of video lines and each of said gaps has a duration greater than that of three video lines.

18. An apparatus for processing encoded audio information comprising:

means for receiving a reference signal conveying a video frame reference for each video frame of a sequence of video frames, means for receiving an input signal and generating in response thereto a plurality of sequences of blocks of encoded information, wherein a beginning block in a respective sequence of blocks is separated from an ending block in a preceding sequence of blocks by a gap that is time aligned with a respective video frame reference, and means for generating audio information that represents said encoded information in a decoded form by applying a block-decoding process to said blocks of encoded information, wherein a respective segment of said audio information is generated from said respective sequence of blocks of encoded information and said respective segment of audio information is time-aligned with a video frame reference subsequent to said respective video frame reference.

19. An apparatus according to claim 18 wherein said block-decoding process comprises:

means for generating a plurality of frequency subband representations of an audio information by adaptively allocating bits to said blocks of encoded information according to psychoacoustic principles, and means for applying a bank of synthesis filters to said frequency subband representations to synthesize said audio information.

20. An apparatus according to claim 18 or 19 wherein each of said video frames has a duration equal to a frame interval and the duration of said gaps is within a range from about one percent of said frame interval to about twenty percent of said frame interval.

21. An apparatus according to claim 18 wherein said video frames comprise video information arranged in a plurality of video lines and each of said gaps has a duration greater than that of three video lines.

22. An apparatus according to claim 15 wherein said block-decoding process comprises:

means for generating a plurality of frequency subband representations of an audio information by adaptively allocating bits to said blocks of encoded information according to psychoacoustic principles, and means for applying one or more inverse transforms to said frequency subband representations to synthesize said audio information.

* * * * *